June 30, 1953 A. JUBB 2,643,514
FUEL SYSTEM FOR GAS-TURBINE ENGINES WITH MEANS TO
MAINTAIN THE FUEL SUPPLY WITHIN DESIRED LIMITS
DURING TRANSIENT OPERATING CONDITIONS Filed Aug. 12, 1949 5 Sheets-Sheet 1

INVENTOR
ALBERT JUBB
By Wilkinson + Mawhinney
ATTYS.

June 30, 1953 A. JUBB 2,643,514
FUEL SYSTEM FOR GAS-TURBINE ENGINES WITH MEANS TO
MAINTAIN THE FUEL SUPPLY WITHIN DESIRED LIMITS
DURING TRANSIENT OPERATING CONDITIONS
Filed Aug. 12, 1949 5 Sheets-Sheet 5

INVENTOR
ALBERT JUBB
By Wilkinson + Mawhinney
ATTYS.

Patented June 30, 1953

2,643,514

UNITED STATES PATENT OFFICE 2,643,514

FUEL SYSTEM FOR GAS-TURBINE ENGINES WITH MEANS TO MAINTAIN THE FUEL SUPPLY WITHIN DESIRED LIMITS DURING TRANSIENT OPERATING CONDITIONS

Albert Jubb, Buttershaw, Bradford, England, assignor to Rolls-Royce Limited, Derby, England, a British company Application August 12, 1949, Serial No. 109,842
In Great Britain August 23, 1948

26 Claims. (Cl. 60—39.28)

1

This invention relates to fuel-systems for gas-turbine engines. Such engines normally comprise a compressor-system delivering air to combustion equipment into which liquid fuel is injected by means of fuel-injector nozzles, the products of combustion passing through a turbine-system to drive the compressor. Such an engine may be utilised for jet-propulsion of aircraft, and/or shaft horse power for driving an external load may be derived from the turbine system, e. g. to drive an airscrew. Although the invention is primarily applicable to fuel-systems for aircraft gas-turbine engines it also has application to gas-turbine engines used for other purposes.

Known forms of fuel-systems for such engines comprise a pump delivering liquid fuel under pressure to the fuel-injectors through a throttle device which is arranged to vary the fuel pressure at the fuel-injectors and thus to control the rate of fuel-flow according to the setting of the throttle device.

A difficulty has arisen with such fuel-systems in that the fuel-supply to the engine under transient conditions during acceleration may be excessive due to rapidity of opening of the throttle device as compared with the relative slowness of acceleration of the engine. Excess fuel during acceleration gives rise to undesirable characteristics, e. g. overheating of combustion and turbine parts, and may also result in extinction of the combustion if the fuel-air mixture becomes overrich. Further, with certain engines, excessive combustion temperatures during acceleration may result in "surging" of the compressor. It will also be appreciated that, in the case of aircraft gas-turbine engines, the degree to which over-fuelling takes place during acceleration may be increased at high altitude due to the reduction of available power which can be developed for acceleration of the engine rotor at reduced ambient air-density conditions.

It is therefore desirable to provide means in a fuel-system for a gas-turbine engine such as those used for aircraft propulsion, which during acceleration of the engine maintains the fuel supply within defined limits, so that the undesirable characteristics mentioned above are avoided.

It has been proposed to provide means for this purpose comprising a device limiting the fuel-pressure at the fuel injector nozzles during transient conditions, by establishing a balance between the fuel pressure at the injector nozzles and the instantaneous delivery pressure of the engine compressor. In that arrangement the characteristics of the control device are dependent upon the pressure-flow characteristics of the injector nozzles used in the fuel system, and in some cases this has proved to be a disadvantage; also that arrangement does not readily permit of the selection of the characteristic of the control to meet the differing acceleration characteristics of various engines.

According to the present invention a gas-turbine engine fuel-system of the kind including a fuel pump, fuel injectors, steady running means to control the fuel flow to fuel injectors according to a selected datum for steady running, and datum setting mechanism for selecting the datum, comprises acceleration control means for controlling the fuel flow through the fuel injectors during acceleration of the engine, which acceleration control means comprise a fuel flow restricting means located in a pipe line through which the actual fuel flow to the fuel injectors is passed, and having an effective restriction which is not varied directly by the datum setting mechanism, a first pressure-sensitive device subjected to the pressure drop derived across the restricting means, and a second pressure sensitive device subjected to the delivery pressure of the compressor system, or to a proportion thereof, and means for varying the fuel flow, the pressure sensitive devices being operative to load in opposition the means varying the fuel-flow thereby to limit the actual fuel flow in dependence on the compressor delivery pressure.

In this specification the term "atmospheric pressure" includues static atmospheric pressure, and static atmospheric pressure as modified by the velocity head due to the forward speed of an aircraft or by conditions in the air intake to the engine compressor or by both the forward speed and the conditions in the air intake.

Preferably the second pressure sensitive device is subjected to the absolute delivery pressure of the compressor system or to a proportion thereof or to a combination of the absolute delivery pressure and atmospheric pressure. The datum setting means may, for example, comprise a manually operated throttle in the fuel delivery line, or the datum setting means may be arranged to select a temperature at a point in the engine or an engine rotational speed, and the steady running means arranged to control the fuel flow to the injectors to maintain the selected temperature or rotational speed, the acceleration control means over-riding the function thereof during transient accelerating conditions.

The adoption of the invention enables the functioning of the acceleration control means to be independent of the pressure-flow characteristics of the fuel injectors, the acceleration control means being related to the actual fuel flow to the injectors.

Preferably means are provided for rendering the acceleration control means inoperative, either automatically or manually. Thus according to a further feature of the invention the acceleration control means may be rendered inoperative in accordance with a preselected actual engine running condition or condition related thereto, e. g. at a preselected rotational speed of the engine, at a preselected compression ratio of the compressor system, or at a preselected fuel flow condition in the engine.

Alternatively, or in addition a manually selected control may be provided to render the acceleration control means inoperative under certain conditions.

In one form of the invention in which the acceleration control means is rendered inoperative at a predetermined value of the actual fuel flow to the fuel injectors, the flow restricting means comprises a combination with the flow restricting means, the area of which flow restricting means may vary in accordance with the flow therethrough, of a valve for bypassing the flow restricting means, which valve becomes operative at a preselected flow whereby the pressure drop across the restricting means varies as a selected function of the flow up to the preselected value of the flow when the bypass valve opens to maintain the pressure drop substantially constant at flows above said value. In this manner the acceleration control may be utilised to effect control of the fuel flow through the fuel injectors up to a flow at which the bypass valve opens, whilst at flows in excess thereof the control becomes inoperative. Since the by-pass valve opens at a selected fuel flow to the engine and since the fuel required to maintain a selected engine speed decreases with increase of altitude (or decrease of atmospheric pressure), the engine speed at which the acceleration control becomes inoperative increases with increase of altitude, so that the range of engine speeds over which the acceleration control is operative increases with increase of altitude. In such an arrangement the characteristic of the flow restricting means apart from the by-pass valve can be made to give a substantially straight line relationship between flow and pressure drop, for example, by providing a spring-loaded restrictor, which is moved in accordance with the fuel flow therethrough, so as to increase the effective area of the restricting orifice with increase of fuel-flow.

Alternatively, the acceleration control may be rendered inoperative at a selected engine rotational speed, by means of a centrifugal governor device, which may, for example, isolate the means controlling the fuel flow from the controlling action of the pressure sensitive devices. Thus in an application of the invention in which the fuel system is of known kind and includes a variable stroke pump, the stroke setting device of which is controlled by a hydraulic servo system including a valve controlled by the pressure sensitive devices, an isolating valve may be provided which blanks off the servo system at a predetermined rotational speed, thus rendering the acceleration control inoperative on the stroke setting device of the fuel pump. In yet another arrangement, such an isolating valve may be operated at a predetermined compression ratio of the engine.

Additionally or alternatively such an isolating valve may be controlled by manual selection so that the acceleration control may be rendered inoperative, under certain conditions, e. g. during aircraft take-off.

Preferably, and especially in the application of the invention to fuel systems of gas-turbine engines used for aircraft propulsion, the acceleration control in accordance with the invention is utilised in combination with means controlling the delivery pressure of the fuel pump in accordance with ambient atmospheric pressure, the delivery pressure being reduced with decrease of atmospheric pressure, such as occurs on increase of altitude, in a manner appropriate to maintain constant engine speed or engine power with changes of atmospheric pressure without adjustment of the throttle or equivalent datum setting means.

Some embodiments of gas-turbine fuel system of this invention will now be described with reference to the accompanying drawings in which.

Figure 1:
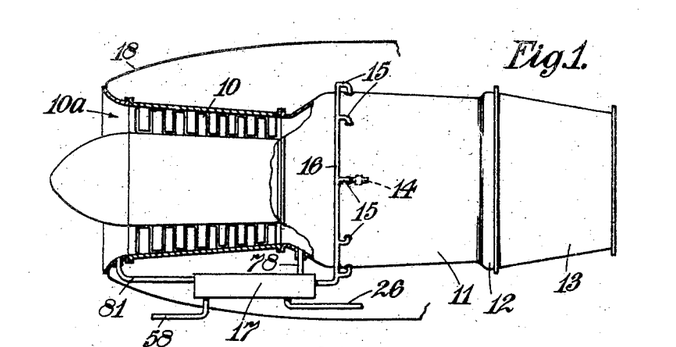
Figure 1 is a diagrammatic illustration of a simple gas-turbine engine.

Referring to Figure 1, the gas-turbine engine which is of known construction, comprises a compressor 10, illustrated as an axial flow compressor, combustion equipment (not shown) accommodated within a casing 11, a turbine 12 and exhaust equipment 13. As is usual the compressed air from the compressor 10 passes into the combustion equipment to have fuel burnt in it, and the heated air passes through the turbine to drive it. The turbine 12 drives the compressor 10 and the exhaust gases pass into the exhaust assembly and thence to a jet-pipe (not shown).

Fuel is fed into the combustion equipment by a plurality of injection devices 14 fed by branches 15 from a manifold 16 to which fuel is delivered in a controlled manner by a fuel system 17 to be described in more detail hereinafter.

The engine is illustrated as being located in a nacelle 18.

The fuel systems described hereinafter are of the type comprising a known fuel pump 20 of the variable capacity type.

Figures 2, 3:
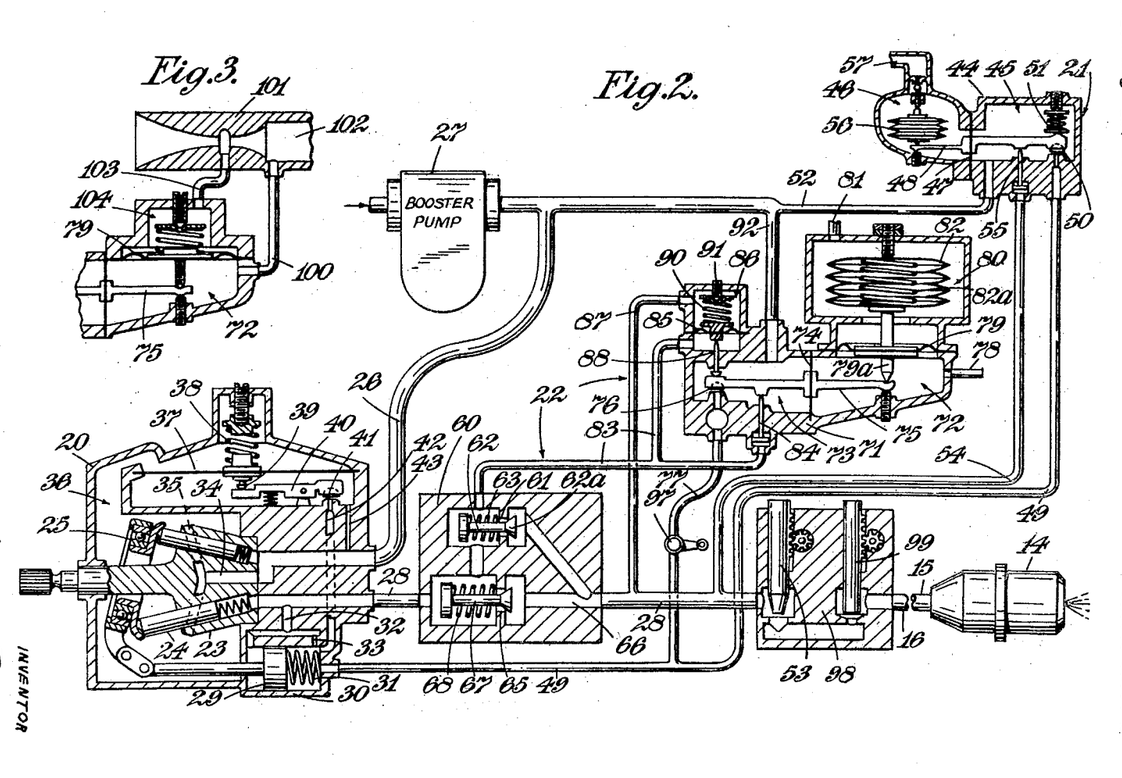
Figure 2 illustrates diagrammatically one fuel system arrangement suitable for use with the gas-turbine engine of Figure 1.
Figure 3 illustrates a modification of part of Figure 2.
Figures 4, 5:
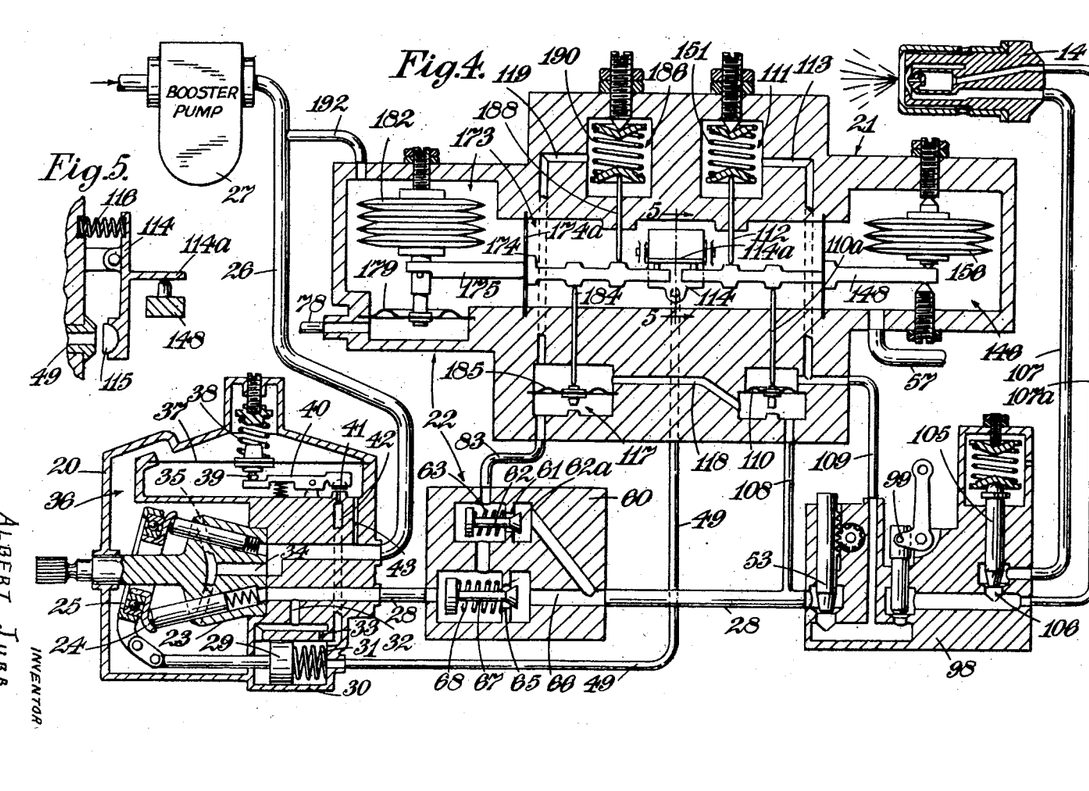
Figure 4 illustrates diagrammatically a second fuel system arrangement suitable for use with the gas-turbine engine of Figure 1.
Figure 5 illustrates a detail of part of Figure 4 and is a section on the line 5—5 of Figure 4.

In both the construction of Figure 2 and the construction of Figure 4, the fuel pump is illustrated as being of the variable capacity type and having a pump rotor 23 formed with a number of substantially axial cylinders containing plungers 24, the stroke of which in the cylinders on rotation of the rotor 23 is determined by the angle of inclination of a swash plate mechanism 25. The fuel is fed to the suction side of the pump through a pipeline 26 and, as is usual, a booster pump 27 is provided to draw fuel from a fuel tank (not shown) and to deliver it to the suction side of the main fuel pump 20. The main fuel pump 20 delivers through a pipeline 28 past various control elements hereinafter to be described to the manifold 16 and fuel injectors 14 of the engine.

The angle of inclination of the swash plate mechanism 25 is controlled by the position of the piston 29 in a cylinder 30. The piston 29 is loaded by a spring 31 which tends to urge the swash plate mechanism 25 to a position in which the plungers 24 operate with their full stroke and the piston is arranged to be loaded by fluid pressure on each side thereof. For this purpose the cylinder 30 is connected at each end through a passage 32 to the delivery side of the main fuel pump 20, the supply to the spring-loaded side of the pump passing through a restriction 33. Bleed passages are provided from the spring-loaded side of the piston. In operation, when no fuel is flowing through the bleed passages the fluid pressures acting on the piston 29 are the same and the spring is effective to move the piston to a position corresponding to full stroke of the engine. However, when a bleed occurs through one of the bleed passages the fluid pressure acting on the spring-loaded side of piston 29 falls, so that the piston is moved against the action of the spring 31 reducing the stroke of the plungers 24.

The main fuel pump 20 as illustrated comprises a known type of speed governor in which the rotor 23 of the pump acts as a centrifugal impeller. For this purpose the rotor 23 is formed with a central passageway 34 communicating at one end with the suction side of the pump and at its other end with a series of radial passages 35, so that on rotation of the rotor 23 fuel is drawn in through the passage 34 and delivered into the space 36 at an increased pressure dependent on the speed of rotation of the rotor 23 thus loading a diaphragm 37. When the load on the diaphragm 37 reaches a selected value determined by the strength of a tension spring 38 connected with the diaphragm, a tappet 39 carried by the diaphragm engages with a rocking lever 40 to rock it and to open a half-ball valve 41 thereby to allow fluid to be bled from the spring-loaded side of the piston 29 through a passage 42. The fluid bled off through the passage 42 returns to the suction side of the main fuel pump 20 through a passage 43.

As is well-known, a gas-turbine engine requires less fuel to maintain a given engine speed under steady running conditions at high altitude than it does at low levels and accordingly the fuel system is provided with a known basic atmospheric pressure responsive control 21 which is operative at any given atmospheric pressure to maintain the fuel pressure upstream of a throttle 53 at a selected value and to reduce the selected pressure and thus the fuel flow to the engine as the atmospheric pressure decreases so that for a given setting of the throttle 53 the engine speed is maintained substantially constant.

Referring to Figure 2, the basic control 21 comprises a body 44 divided into two chambers 45 and 46 by a diaphragm 47. The diaphragm carries a lever 48, one end of which projects into the chamber 45 and the other end of which projects into the chamber 46. The chamber 45 is connected with the spring-loaded side of the piston 29 by a bleed pipe 49 and the flow through the bleed pipe is controlled by a half ball valve 50 carried on the end of the lever 48 projecting into the chamber 45. This end of the lever is loaded by a spring 51. The chamber 45 is connected by a pipeline 52 with the suction side of the main fuel pump 20. The lever 48 is also arranged to be loaded in accordance with the fuel delivery pressure which in this case is the pressure difference between the pressure just upstream of the manually-operated throttle 53 (constituting fuel-flow selecting means for steady running conditions of the engine) and the pressure on the suction side of the main fuel pump 20. For this purpose a branch line 54 is taken from the fuel delivery pipe 28 to a small cylinder formed in the body of the unit 21, so that the pressure just upstream of the manual throttle 53 acts on the head of a tappet member 55. It will be clear that as the pressure just upstream of the throttle 53 increases, the load placed on the lever 48 by the tappet member 55 increases in proportion.

The end of the lever 48 projecting into the chamber 46 is acted on by an evacuated expansible capsule 56 and the chamber 46 is connected through a conduit 57 either to a static pressure point on the aircraft or to a Pitot device, such as is indicated at 58 in Figure 1, or to a point in the air intake to the compressor 10 of the engine. Thus, as the atmospheric pressure falls, the capsule 56 will expand increasing its effective load on the lever 48.

It will be seen that the loads afforded by the capsule 56 and the tappet 55 oppose the load on the lever 48 afforded by the spring 51. Thus under steady atmospheric conditions should the fuel pressure just upstream of the manual throttle 53 increase beyond a selected value, the combined loads of the capsule 56 and the tappet 55 will overcome the spring 51 and the valve 50 will open bleeding off fuel from the spring-loaded side of the piston 29, permitting the stroke of the pump to be reduced to restore the fuel pressure to a selected value. Also on change of atmospheric pressure, say on fall of atmospheric pressure, the capsule 56 will expand, increasing the load on the lever 48 so that the combined loads of the capsule 56 and the tappet 55 will overcome the spring allowing fuel to be bled off from the spring-loaded side of the piston 29, so that the fuel pressure just upstream of the throttle 53 will fall until balanced conditions are again reached. In other words, on change of atmospheric pressure, the atmospheric pressure control 21 is effective to vary the fuel delivery pressure in the desired manner and affords together with the throttle 53 basic control or steady running control means by which the desired engine rotational speed can be selected and, when reached, can be maintained.

With a fuel system as so far described with reference to Figure 2, the basic control 21 is ineffective during transient conditions, e. g., in acceleration, immediately following an adjustment of the throttle 53 to select a new fuel flow, and difficulties can arise in the operation of a gas-turbine engine during acceleration due to excessive fuel being delivered to the engine. For example, if excess fuel is delivered to the engine during acceleration overheating of the combustion equipment and turbine parts may occur with consequent damage to them and also the fuel/air mixture becomes over-rich, which may result in extinction of combustion. Also with certain engines excessive combustion temperatures during acceleration may result in "surging" of the compressor. The present invention overcomes these difficulties by providing an acceleration control 22 now about to be described, which control limits the quantity of fuel which can be delivered to the engine in dependence upon the pressure rise in the compressor of the engine.

Figure 7:
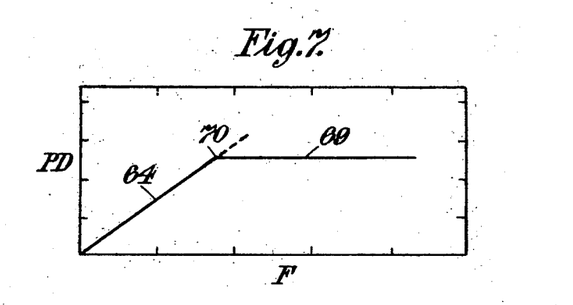
Figure 7 is a graph representing the manner of variation of the pressure drop across a part of the illustrated fuel system with the fuel flow through the part.

The acceleration control 22 comprises a valve located in the pipeline 28, the valve comprising a valve body 60, through which the fuel flowing in pipeline 28 passes, a valve seat 61 formed around a port in a passage in the valve body connecting the inlet to and the outlet from the valve body 60 and a valve member 62 which is loaded by a spring 63 to close the port. The fuel flow through the valve body 21 causes the valve member 62, which conveniently has a conical head, to open and create a pressure drop across the valve body. The shape of the head 62a of the valve member 62 and the rating of the spring 63 are so selected that there is a substantially linear relationship between the pressure drop across the valve and the fuel flow therethrough. Referring to Figure 7, there is illustrated a graph showing the characteristics of the valve 62 and on this graph the fuel flows F through the valve are plotted as the abscissae and the corresponding pressure drops across the valve are plotted as the ordinates. As is indicated by the trace 64 the pressure drop across the valve 62 is made linear with the fuel flow. In other words, the valve 52 has a substantially linear fuel flow/pressure drop characteristic.

The valve body 60 also comprises a second valve seat 65 surrounding a port in a passage 66 by-passing the valve member 62. The port surrounded by the seat 65 is normally closed by a valve member 67 which is held on the seat 65 by a spring 68. The dimensions of the valve member 67 and the rating of the spring 68 are so selected that, when the pressure drop across the port controlled by the valve member 62 reaches a predetermined value, the valve opens and the pressure drop between the inlet side and the outlet side of the valve body 60 remains substantially constant irrespective of further increase in the fuel flow. This effect is illustrated on the curve in Figure 7 by the horizontal line 69, the point 70 being the point at which the by-pass valve 67 opens.

The acceleration control also comprises means to adjust the fuel flow having a body 71 divided into two chambers 72 and 73 by a diaphragm 74. The diaphragm carries a lever 75, the ends of which project respectively into the chambers 72 and 73. The lever 75 carries on its end projecting into the chamber 73 a half ball valve 76 controlling the flow of fuel through a branch line 77 from the bleed pipe 49 and thus controlling the flow of fuel from the spring-loaded side of the piston 29 thereby to adjust the fuel flow to the engine.

The lever 75 is controlled as to its rocking movement by applying three loads to it as follows:

(a) a load which is dependent in part at least upon the absolute compressor delivery pressure, (b) a load dependent on the pressure drop across the valve body 60, and (c) a spring load.

The load dependent upon the absolute compressor delivery pressure is applied by connecting the chamber 72 through a pipeline 78 with the delivery side of the compressor 10 (Figure 1) and by providing, as part of the wall of the chamber 72, a diaphragm 79 separating it from a further chamber 80 the pressure in which is an atmospheric pressure, which in the construction illustrated is the pressure in the intake of the compressor, the connection between the chamber 80 and intake 10a being through pipeline 81. The diaphragm 79 is connected with an evacuated capsule 82 accommodated in the chamber 80, and a spring 82a housed within the capsule 82 urges the diaphragm towards the lever 75 and by a projecting nib 79a loads the lever to tend to open valve 76. In operation, if the effective areas of the diaphragm 79 and capsule 82 are selected to be equal then the load applied to the lever by spring 82a is progressively decreased as the absolute compressor delivery pressure increases by an amount proportional to the absolute compressor delivery pressure. If the effective areas of the diaphragm 79 and capsule 82 are unequal then the decrease in the spring load applied to the lever 75 is part determined by the absolute compressor delivery pressure and in part by an atmospheric pressure. The arrangement therefore is such that as the absolute compressor delivery pressure increases, the load tending to open valve 76 applied to the lever 75 decreases, or in other words the compressor delivery pressure acts in a sense to assist in closing valve 76.

The load proportional to the pressure drop across the valve body 60 is applied to the lever by taking a branch 83 from the valve body 60 upstream of the port controlled by the valve member 62 to a cylinder containing the head of a tappet member 84 similar to the tappet member 55 of the atmospheric pressure control 21 and also to the underside of a diaphragm 85 contained in an auxiliary chamber 86, the opposite side of which is connected by a pipeline 87 to the downstream side of the valve body 60. The diaphragm is loaded towards lever 75 by a spring 90 and movements of the diaphragm 85 due to changes in the pressure drop are communicated to the lever 75 by a tappet 88 located between the diaphragm and lever. The arrangement of these parts is such that the spring 90 tends to hold valve 76 closed and that the loads on the diaphragm 85 and tappet 84 due to the pressure drop across the valve body 60 tend to open the half ball valve 76. The pressure drop thus acts in a sense to assist in opening the valve 76, i. e. in a sense opposite to the compressor delivery pressure.

The third load, that is the spring load, is due to the combined effects of the spring 82a and spring 90 which latter spring has one abutment on the diaphragm 85 and a second abutment on a plate bearing on an adjustment screw 91. The effective load due to the springs is such as to tend to keep the half ball valve 76 closed.

The operation of the device is as follows. As the compressor delivery pressure increases the effective load on the lever 75 applied through nib 79a decreases, so that the load due to the pressure drop across the valve body 60 must increase for the half ball valve 76 to be opened against the spring load. Thus, during acceleration, for each compressor delivery pressure the flow through the valve 62 can increase only until the valve 76 opens, when a flow of bleed fuel occurs through the bleed pipe 49 and branch pipe 77 back to the suction side of the pump through a return pipe 92 causing the stroke of the main fuel pump 20 to be reduced. Thus, during acceleration, the actual flow of fuel to the fuel injectors 14 is limited in dependence on the instantaneous compressor delivery pressure and as the engine speeds up and consequently the compressor delivery pressure increases, so the maximum permissible pressure drop across the valve body 60 and the maximum permissible actual fuel flow also increases.

As stated above, when the flow through the valve body 60 reaches a predetermined value the valve member 67 moves off its seat and the pressure drop thereafter remains constant.

Figure 8:
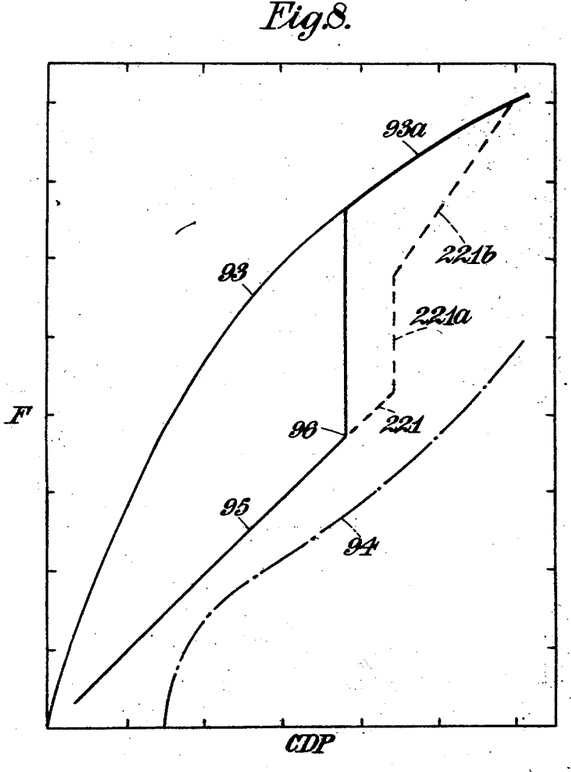
Figures 8 and 9 are graphical representations of the fuel flow to the engine during acceleration plotted against engine compressor delivery pressure.
Figure 9:
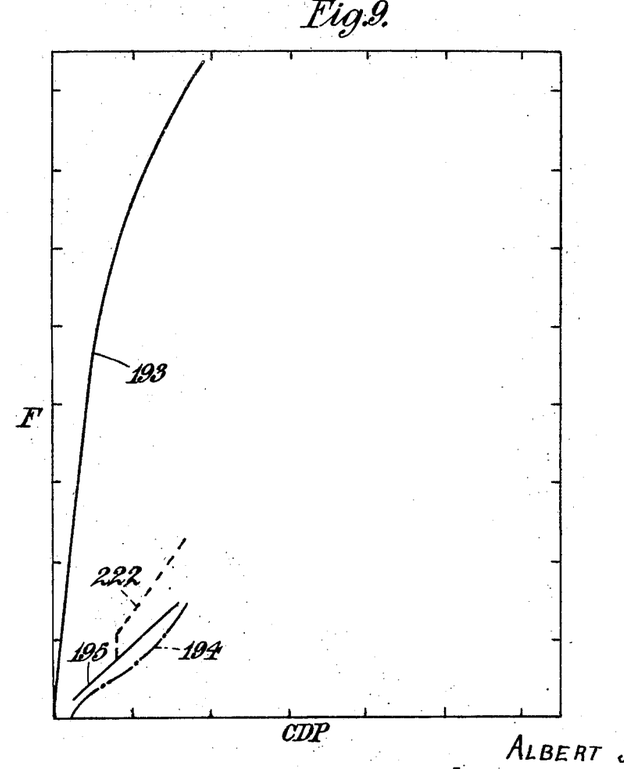

The effect of the acceleration control on the relation between the actual fuel flow and the compressor delivery pressure is illustrated graphically in Figures 8 and 9, in which the fuel flow F is plotted against the compressor delivery pressure CDP. Referring to Figure 8, the curved line 93 indicates the maximum fuel delivery of the fuel pump for various compressor delivery pressures. The chain line 94 illustrates the engine fuel requirements under steady running conditions and the line 95 illustrates the actual fuel delivery during acceleration as the compressor delivery pressure increases. These curves all relate to ground level conditions. It will be seen that as the compressor delivery pressure increases the fuel flow F increased proportionally until the point 96 is reached, which represents the point at which the valve member 67 opens. Thereafter the fuel flow becomes the maximum fuel delivery of the pump as indicated by the thickened portion 93a of the curve 93. The point 96 is selected according to the characteristics of the engine which may be such that the engine is capable of accommodating the full fuel delivery at higher engine speeds, by suitably selecting the loading of the spring 68.

Referring to Figure 9, similar curves are shown for high altitude conditions, the curves corresponding to curves 93, 94 and 95 being referenced 193, 194 and 195 respectively. Since the fuel flows at high altitude are much lower than those at ground level, the valve member 67 never comes off its seat even under high speed conditions, so that the fuel flow F is always proportional to the compressor delivery pressure CDP. In other words, the selection on a flow basis of the change point, at which the valve 67 comes off its seat and renders the acceleration control inoperative, ensures that the rotational speed at which the acceleration control becomes inoperative increases with increase of altitude and that under high altitude conditions the acceleration control is operative throughout the whole range of acceleration. This is desirable since the power which can be developed for acceleration of the engine rotor falls with increase of altitude whilst the inertia of the rotor remains constant.

Referring again to Figure 2, a valve 97 is provided in the branch pipe 77 so that the acceleration control may, if desired, be rendered inoperative.

The throttle 53 is illustrated as being mounted in a body 98 in which is also provided a shut-off valve 99 which during operation of the engine is fully open.

Referring now to Figure 3, there is illustrated an alternative method for loading the lever 75 in accordance with the absolute compressor delivery pressure. In this arrangement the chamber 72 is connected by a pipeline 100 to the inlet of a Venturi device 101, the inlet 102 of which is connected with the compressor delivery. The Venturi device 101 is arranged to be choked during normal operation of the engine and the throat of the venturi 101 is connected by a conduit 103 to a chamber 104 which is separated from the chamber 72 by the diaphragm 79. As will be well understood, when the venturi is choked the pressure at the throat of the venturi bears a constant relation to the absolute pressure at the inlet to the venturi, so that the load on the diaphragm 79 is always proportional to the absolute delivery pressure of the compressor.

Referring now to Figures 4 and 5, there is illustrated an arrangement in which the atmospheric pressure control 21 is combined as a unit with the acceleration control 22. The two units operate independently and are essentially similar in construction to the corresponding parts illustrated in Figure 2.

In this construction, the throttle 53 is, as in Figure 2, located in a body 98 which has located in it also a shut-off cock 99. In this construction, the body 98 comprises also a pressurising valve 105 which is spring-loaded on to its seat 106 to control the flow of fuel through a main pipeline 107 to the main jet of a double jet burner of well-known form. During slow running fuel passes only through a pipeline 107a to the slow running jet of the burner, and when the fuel delivery pressure at the burners 14 increases to a preselected value the valve 105 is lifted off its seat 106 to permit fuel to pass to the main jets of the burners 14. Such an arrangement does not form an essential part of this invention.

In the construction illustrated in Figure 4, instead of the atmospheric pressure control controlling the fuel delivery pressure just upstream of the throttle 53, it is arranged to control the pressure drop across the throttle 53.

For this purpose a pair of branch pipes 108, 109 are connected with the fuel delivery line 28, one on each side of the throttle 53, and are connected at their other ends to a chamber having in it a diaphragm 110, one on each side of the diaphragm. The diaphragm 110 is therefore loaded in accordance with the pressure drop across the throttle 53 and this load is transmitted by a tappet 110a to a lever 148 which corresponds to the lever 48 of the device 21 shown in Figure 2. The lever 148 is loaded by a barometric capsule 156 accommodated in a chamber 146 and by a spring 151 accommodated in a chamber 111, the load of the spring being transmitted to the lever 148 by a tappet 112. The chamber 111 is connected by a duct 113 to the branch pipe 109 to compensate for the difference in the effective areas of the sides of the diaphragm 110. The lever 148 during steady running conditions controls the outflow of fuel from the spring-loaded side of the piston 29 through bleed pipe 49 by acting on a bleed valve which is illustrated in more detail in Figure 5.

The bleed valve comprises a rocking lever 114 carrying a half ball 115 which closes the outlet from the bleed pipe 49, the lever 114 being normally urged by a spring 116 to a position in which the half ball 115 closes the outlet from the bleed pipe 49.

The lever 114 is provided with a shelf-like portion 114a with which a pin carried on the end of the lever 148 engages to rock the lever 114.

The atmospheric pressure control operates in a manner similar to that described with reference to Figure 2 to reduce the maximum possible pressure drop across the throttle 53 as the atmospheric pressure decreases, thus accommodating changes in fuel consumption with the changes of atmospheric pressure.

The acceleration control unit comprises a lever 175 carried on the diaphragm 174 separating two halves of a chamber 173 which are in communication through apertures 174a in the diaphragm.

The lever 175 is arranged to be loaded in accordance with the pressure drop across the valve body 60 by means of a diaphragm 185 contained in a chamber 117, one side of the diaphragm being loaded by the pressure upstream of the valve body 60 through the pipeline 83 and the other side of the diaphragm being loaded by the pressure downstream of the valve body through the branch pipe 108, the chamber on one side of the diaphragm 110 and connecting duct 118. The load is transmitted from the diaphragm 185 to the lever 175 through a tappet 184.

The lever 175 is also loaded by a spring 190 through a tappet 188, the spring being accommodated in a chamber 186 which is connected by a duct 119 to the upper side of the diaphragm 185, this arrangement being adopted to compensate for the differences in the effective areas of the sides of the diaphragm 185.

The lever 175 is also loaded in accordance with the absolute delivery pressure of the compressor by connecting one side of the diaphragm 179 through a conduit 78 with the delivery side of the compressor, the diaphragm being connected with an evacuated capsule 182. The chamber 173 is connected by a pipeline 192 to the suction side of the main fuel pump 20, and the effective area of the capsule 182 is selected to be equal to the effective area of the diaphragm 179.

If desired the apertures 174a may be omitted and the chamber containing capsule 182 connected to an atmospheric pressure. In this case if the effective areas of the capsule 182 and diaphragm 179 are equal the load on the lever 175 will depend on the absolute compressor delivery pressure only whereas if the effective areas are unequal the load will depend on the absolute compressor delivery pressure and on the atmospheric pressure.

The lever 175 is arranged to engage the shelf-like portion 114a of the lever 114 during acceleration to control the outflow during acceleration from the bleed pipe 49 and thus to override the atmospheric pressure control during acceleration. As will be clear, the loads on the lever 175 due to the spring 190 and the compressor delivery pressure act in a sense to maintain valve 115 closed, and the load on the lever 175 due to the pressure drop across valve body 60 acts in the opposite sense to tend to open the valve 115, and the acceleration control thus acts in the same manner as that described with reference to Figure 2 giving fuel flow F/compressor delivery pressure CPD characteristics similar to those illustrated at 95, 96, 93a and 195 illustrated in Figures 8 and 9.

In certain circumstances it may be desirable to provide an additional control in the fuel systems as above described. For example, if the characteristics of the acceleration control are so chosen to give satisfactory acceleration conditions up to compression ratios in the engine compressor of 3:1, it may occur at high altitude and at high engine rotational speeds, that during acceleration there is a tendency to starve the engine of fuel.

To overcome this difficulty the fuel systems above described may be modified by provision of a control which, when a certain compression ratio is reached in the compressor, increases the effective load on the rocking lever of the acceleration control due to the absolute compressor delivery pressure, so that a greater pressure drop is required across the valve body 60 before the acceleration control operates to bleed off fuel from below the spring-loaded side of the piston 29. The effect of this is that when the preselected compression ratio is reached greater fuel flows are permitted to the engine.

Figure 6:
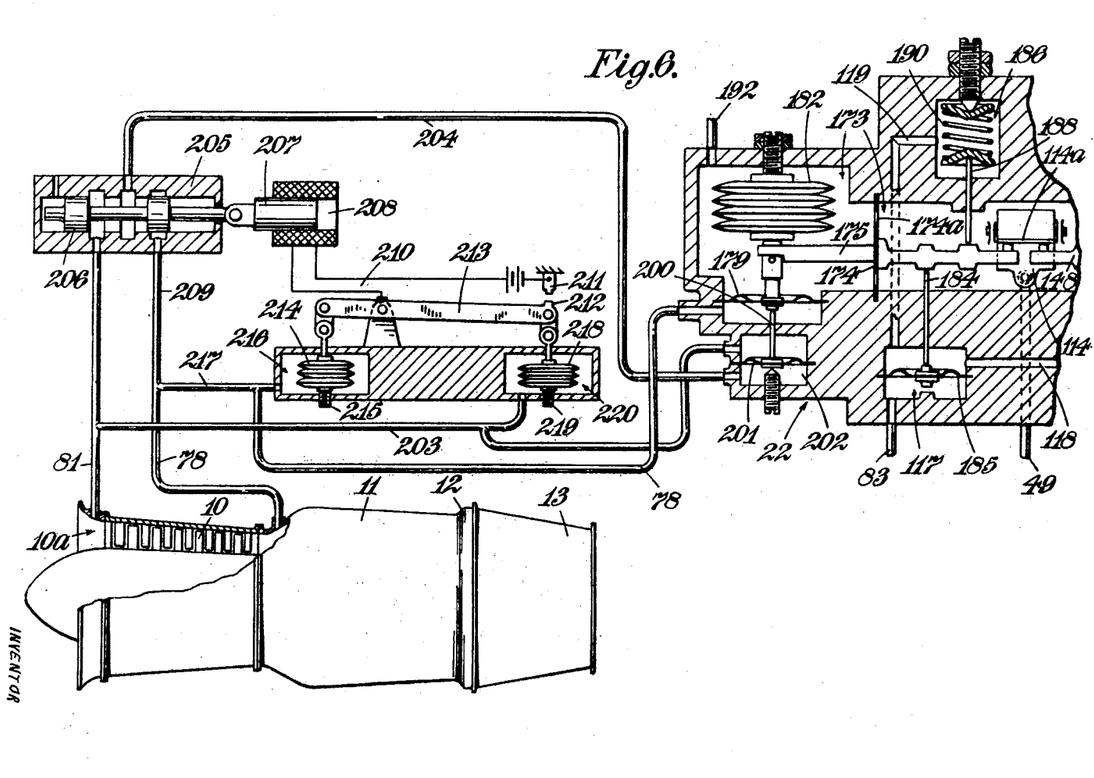
Figure 6 illustrates a modification of the fuel system arrangement of Figure 4.

One arrangement for effecting this control is illustrated in Figure 6 as applied to the fuel system described with reference to Figure 4.

Referring to Figure 6, there is illustrated a gas-turbine similar to that shown in Figure 1 having bleed-off pipes 81 and 78 from the intake and delivery of the compressor 10 of the engine. There is also illustrated the acceleration control portion of the combined atmospheric pressure control and acceleration control unit. In this figure the same reference numerals are used as in Figures 1 and 4 for parts which are not modified.

The diaphragm 179 to which the compressor delivery pressure is applied through the bleed pipe 78 is also acted upon by a tappet 200 connecting the diaphragm 179 with a further diaphragm 201 located in a chamber 202. The upper side of the diaphragm 201 as viewed in the drawing is arranged to be subjected to the compressor inlet pressure through a branch conduit 203 from the bleed pipe 81. The underside of the diaphragm 201 is connected by a conduit 204 to a change-over piston valve 205, the piston valve member 206 of which is connected with the armature 207 of an electro-magnetic device 208. With the piston valve member 206 in the position shown in Figure 6, which position corresponds to the deenergised condition of the electro-magnetic device 208, the conduit 204 is connected through the change-over valve 205 with the bleed pipe 81 and thus to the intake of the compressor, so that the loads acting on the diaphragm 201 are balanced, so that therefore no load is applied by the diaphragm 201 through the tappet 200 to the diaphragm 179. Under these conditions therefore the acceleration control operates in exactly the manner described with reference to Figure 4.

If, however, the piston valve member 206 moves to the right as viewed in the drawing on energisation of the electro-magnetic device 208, the connection between the bleed pipe 81 and the conduit 204 is broken, and the conduit 204 is connected with a branch conduit 209 from the conduit 78 so that the underside of the diaphragm 201 is connected with the compressor delivery. The load acting on the lever 175 due to the diaphragm 179 is thus augmented by the resultant load on the diaphragm 201, which is transmitted to the diaphragm 179 through the tappet 200.

The change-over of the piston valve member 206 is effected in the following manner. The electro-magnetic device 208 is connected in an electric circuit 210, comprising a pair of contacts 211, 212, of which contact 211 is a fixed contact and contact 212 is carried by a pivoted beam 213. The beam is pivoted at such a point in its length that the ratio of the length of its arms equals the compression ratio at which it is desired to augment the fuel delivery to the engine to avoid starving at high speeds and high altitude. The shorter arm of the beam 213 is connected through a link to an evacuated capsule 214 having an adjustable abutment 215, the capsule being located in a chamber 216 which is in communication by conduit 217 with the bleed pipe 78 and thus with the compressor delivery. The longer arm of the beam 213 is connected by a link to a further capsule 218 having an adjustable abutment 219, which capsule is accommodated in a chamber 220 connected with the conduit 203 and thus with bleed pipe 81 and the compressor intake 10a. In operation, the pressure within the chamber 220 remains substantially constant under constant atmospheric conditions, whereas the pressure in the chamber 216 increases with the compression ratio of the compressor, so that as the compression ratio increases the capsule 214 gradually collapses rocking the beam 213 about its pivot and gradually bringing the moving contact 212 towards the contact 211. When the compression ratio in the compressor reaches the preselected value the contact 212 engages with the contact 211 completing a circuit through the electromagnetic device 208, causing the armature 207 thereof to be drawn to the right as viewed in the drawing and closing off the conduit 204 from bleed pipe 81 and placing it in connection with conduit 209 and bleed pipe 78.

The effect of this control is illustrated graphically in Figures 8 and 9. In Figure 8 the dotted extension 221 of the straight line characteristic 95 illustrates the effect which would be obtained under ground level conditions with either of the fuel systems as described with reference to Figures 2 and 4, with the by-pass valve member 67 held permanently on its seat. The effect of increasing the load on the acceleration control, due to the compressor delivery pressure at a predetermined compression ratio, is to cause a kink to appear in the fuel flow/compressor delivery pressure characteristic as indicated at 221a and thus to cause an increased flow represented by the dotted characteristic 221b for compressor delivery pressures above that at which the change-over occurs. However, owing to the high fuel flows under ground level conditions, the by-pass valve 67 opens rendering the acceleration control inoperative before the compression ratio in the compressor reaches the preselected value, so that it will be clear that at low levels the change-over control illustrated and described with reference to Figure 6 has no effect of the fuel flow to the engine.

Referring now to Figure 9, due to the much lower fuel consumption of the engine, the fuel flow at which the by-pass valve 67 opens is not reached, and so when the preselected compression ratio is reached in the engine compressor the change-over mechanism becomes operative and higher fuel flows are permitted to the engine, as indicated by the dotted characteristic 222.

I claim:

1. For a gas-turbine engine including a compressor, combustion equipment arranged to receive air under pressure from said compressor, a fuel system to deliver fuel to said combustion equipment, and a turbine arranged to receive products of combustion from the combustion equipment and connected to said compressor to drive it; an arrangement of said fuel system which comprises a fuel pump, fuel injectors connected to receive fuel from said fuel pump by conduit means including a pipe line arranged to convey the entire flow of fuel received by said fuel injectors, basic control means including fuel-flow-selecting means to control the fuel flow in said pipe line, and acceleration control means which comprise fuel-flow-restricting means located in said pipe line and having a substantially linear fuel flow/pressure drop characteristic, means to adjust the fuel flow to the fuel injectors, first pressure-responsive means arranged to be subjected to the delivery pressure of the compressor and connected to load said means to adjust the fuel flow to increase the fuel flow on increase of said delivery pressure, and second pressure-responsive means arranged to be subjected to the difference in the fuel pressures in said pipe line on each side of said fuel-flow-restricting means, whereby the second pressure-responsive means is subjected to a load directly proportional to the fuel flow of the fuel injectors, said second pressure-responsive means being connected to load said means to adjust the full flow to reduce the fuel flow on increase in said difference of fuel pressures.

2. A fuel system as claimed in claim 1, comprising also means arranged to render said acceleration control means ineffective to control the fuel flow to said fuel injectors.

3. A fuel system as claimed in claim 1, comprising also over-ride means arranged, when a selected value of the fuel flow through said pipe line is attained, to prevent any substantial increase in said difference of fuel pressures.

4. A fuel system as claimed in claim 1, comprising also over-ride means including a by-pass conduit having its ends connected to said pipe line respectively on each side of the fuel-flow-restricting means, and a valve located in said by-pass conduit and arranged to respond to said difference of fuel pressures and to open on attainment of a selected value of said difference of fuel pressures.

5. A fuel system as claimed in claim 1, wherein said means to adjust the fuel flow comprises a rocking lever arranged to be loaded by said first and second pressure-responsive means in opposition to one another, said rocking lever being arranged to control the fuel flow to the fuel injectors through said pipe line.

6. A fuel system as claimed in claim 1, having said means to adjust the fuel flow comprising a rocking lever arranged to be loaded directly by said first pressure-responsive device to rock in one direction and to be loaded by said second pressure-responsive device to rock in the opposite direction, and comprising also a spring arranged to load said rocking lever to rock it in the same direction as the load due to said first pressure-responsive device, said rocking lever being arranged to control the fuel flow to the fuel injectors through said pipe line.

7. A fuel system as claimed in claim 1, having said means to adjust the fuel flow including a rocking lever, and comprising also a pair of springs arranged to load said lever to rock it in opposite directions respectively, whereof the first spring is connected with the first pressure-responsive device such that its effective load on the rocking lever is decreased with increase of the delivery pressure of the compressor, and whereof the second spring is connected with the second pressure-responsive device such that its effective load on the rocking lever decreases with increase of said difference in fuel pressures.

8. A fuel system as claimed in claim 1, wherein said first pressure-responsive device comprises a flexible diaphragm arranged to be subjected on one surface to the compressor delivery pressure and connected with an evacuated capsule whereby the pressure load on said flexible diaphragm is a function of the absolute delivery pressure of the compressor.

9. A fuel system as claimed in claim 1, having said first pressure-responsive means comprising a flexible diaphragm, and a Venturi device having its inlet connected with the compressor delivery and arranged to be choked in normal operation of the engine, said diaphragm being connected to be loaded on one side by the pressure at the inlet to the Venturi device and on its other side by the pressure at the throat of the Venturi device.

10. A fuel system as claimed in claim 1, comprising a third pressure-responsive device, and means responsive to the compression ratio in said compressor and arranged on attainment of a preselected value of said compression ratio to connect said third pressure-responsive device to be subjected to the compressor delivery pressure, said third pressure-responsive device being arranged to load said means to adjust the fuel flow in a manner to augment the load afforded by said first pressure-responsive device.

11. A fuel system as claimed in claim 1, comprising also a flexible diaphragm, means connecting one side of said diaphragm to the compressor intake, valve means arranged to have a first position in which the second side of said diaphragm is connected to the compressor intake and a second position in which it connects the second side of the diaphragm to the compressor delivery, and compression ratio responsive means operative to actuate said valve means so that when a preselected compression ratio is reached the valve is moved from said first position to said second position, said diaphragm being connected with said first pressure-sensitive device to augment the load applied by said first pressure-sensitive device on the means to adjust the fuel flow.

12. A fuel system as claimed in claim 11, having said compression ratio responsive means comprising a rocking beam the length of the arms of which have a preselected ratio to one another, means responsive to the compressor intake pressure connected with the longer arm of the rocking beam to load it in proportion to the compressor intake pressure, means responsive to the compressor delivery pressure connected to the shorter arm of the rocking beam to load it in accordance with the compressor delivery pressure and means interconnecting said rocking beam and said valve means to move it from said first position to said second position on attainment of the preselected compression ratio.

13. A fuel system according to claim 1, wherein said fuel pump comprises means to vary its delivery and wherein said means to adjust the fuel flow comprises a hydraulic servomechanism arranged to adjust said means to vary the delivery of the fuel pump, a bleed valve to vary the pressure in the hydraulic servomechanism and a member arranged to be loaded by said first and second pressure-responsive devices to adjust said bleed valve.

14. For a gas-turbine engine including a compressor, combustion equipment arranged to receive air under pressure from said compressor, a fuel system to deliver fuel to said combustion equipment, and a turbine arranged to receive the products of combustion from the combustion equipment and connected to said compressor to drive it; an arrangement of said fuel system which comprises a fuel pump, fuel injectors connected to receive fuel from said fuel pump by conduit means including a pipe line arranged to convey the entire flow of fuel received by said fuel injectors, basic control means including fuel-flow-selecting means to control the fuel flow to the injectors, and acceleration control means which comprise fuel-flow-restricting means located in said pipe line and having a substantially linear fuel flow/pressure drop characteristic, means to adjust the fuel flow to the fuel injectors, first pressure-responsive means arranged to be subjected to the delivery pressure of the compressor and connected to load said means to adjust the fuel flow to increase the fuel flow on increase of said delivery pressure, resilient means connected to load said means to adjust the fuel flow in a sense to augment the load due to said first pressure-responsive means, and second pressure-responsive means arranged to be subjected to the difference in fuel pressures in said pipe line on each side of said fuel-flow-restricting means, whereby the second pressure-responsive means is subjected to a load directly proportional to the fuel flow to the engine, said second pressure-responsive means being connected to load said means to adjust the fuel flow to reduce the fuel flow on increase in the difference of fuel pressures, whereby when the load exerted by said second pressure-responsive means exceeds the combined loads exerted by said first pressure-responsive means and said resilient means, the fuel flow is reduced and the basic control means is over-ridden.

15. A fuel system as claimed in claim 14, comprising also means arranged to render said acceleration control means ineffective to control the fuel flow to said fuel injectors.

16. A fuel system as claimed in claim 14, comprising also over-ride means arranged, when a selected value of the fuel flow through said pipe line is attained, to prevent any substantial increase in said difference of fuel pressures.

17. A fuel system as claimed in claim 14, comprising also over-ride means including a by-pass conduit having its ends connected to said pipe line respectively on each side of the fuel-flow-restricting means, and a valve located in said by-pass conduit and arranged to respond to said difference of fuel pressures and to open on attainment of a selected value of said difference of fuel pressures.

18. A fuel system as claimed in claim 14, wherein said means to adjust the fuel flow comprises a rocking lever arranged to be loaded by said first and second pressure-responsive means in opposition to one another, said rocking lever being arranged to control the fuel flow to the fuel injectors through said pipe line.

19. A fuel system as claimed in claim 14, having said means to adjust the fuel flow comprising a rocking lever arranged to be loaded directly by said first pressure-responsive device to rock in one direction and to be loaded by said second pressure-responsive device to rock in the opposite direction, and having said resilient means comprising a spring arranged to load said rocking lever to rock it in the same direction as the load due to said first pressure-responsive device, said rocking lever being arranged to control the fuel flow to the fuel injectors through said pipe line.

20. A fuel system as claimed in claim 14 having said means to adjust the fuel flow including a rocking lever, and having said resilient means comprising a pair of springs arranged to load said lever to rock it in opposite directions respectively, whereof the first spring is connected with the first pressure-responsive device such that its effective load on the rocking lever is decreased with increase of the delivery pressure of the compressor, and whereof the second spring is connected with the second pressure-responsive device such that its effective load on the rocking lever decreases with increase of said difference in fuel pressures.

21. A fuel system as claimed in claim 14, wherein said first pressure-responsive device comprises a flexible diaphragm arranged to be subjected on one surface to the compressor delivery pressure and connected with an evacuated capsule whereby the pressure load on said flexible diaphragm is a function of the absolute delivery pressure of the compressor.

22. A fuel system as claimed in claim 14, having said first pressure-responsive means comprising a flexible diaphragm, and a Venturi device having its inlet connected with the compressor delivery and arranged to be choked in normal operation of the engine, said diaphragm being connected to be loaded on one side by the pressure at the inlet to the Venturi device and on its other side by the pressure at the throat of the Venturi device.

23. A fuel system as claimed in claim 14, comprising a third pressure-responsive device, and means responsive to the compression ratio in said compressor and arranged on attainment of a preselected value of said compression ratio to connect said third pressure-responsive device to be subjected to the compressor delivery pressure, said third pressure-responsive device being arranged to load said flow-adjusting means in a manner to augment the load afforded by said first pressure-responsive device.

24. A fuel system as claimed in claim 14, comprising also a flexible diaphragm, means connecting one side of said diaphragm to the compressor intake, valve means arranged to have a first position in which the second side of said diaphragm is connected to the compressor intake and a second position in which it connects the second side of the diaphragm to the compressor delivery, and compression ratio responsive means operative to actuate said valve means so that when a preselected compression ratio is reached the valve is moved from said first position to said second position, said diaphragm being connected with said first pressure-sensitive device to augment the load applied by said first pressure-sensitive device on said means to adjust the fuel flow.

25. A fuel system as claimed in claim 14, having said compression ratio responsive means comprising a rocking beam the length of the arms of which have a preselected ratio to one another, means responsive to the compressor intake pressure connected with the longer arm of the rocking beam to load it in proportion to the compressor intake pressure, means responsive to the compressor delivery pressure connected to the shorter arm of the rocking beam to load it in accordance with the compressor delivery pressure and means interconnecting said rocking beam and said valve means to move it from said first position to said second position on attainment of the preselected compression ratio.

26. A fuel system as claimed in claim 14, wherein said fuel pump comprises means to vary its delivery and wherein said means to adjust the fuel flow comprises a hydraulic servomechanism arranged to adjust said means to vary the delivery of the fuel pump, a bleed valve to vary the pressure in the hydraulic servomechanism and a member arranged to be loaded by said first and second pressure responsive device and said resilient means.

ALBERT JUBB.

References Cited in the file of this patent

UNITED STATES PATENTS

| Number | Name | Date |
| --- | --- | --- |
| 2,193,114 | Seippel | Mar. 12, 1940 |
| 2,446,339 | Orr | Aug. 3, 1948 |
| 2,503,048 | Ifield | Apr. 4, 1950 |

FOREIGN PATENTS

| Number | Country | Date |
| --- | --- | --- |
| 490,978 | Great Britain | Aug. 24, 1938 |
| 580,149 | Great Britain | Aug. 8, 1946 |